US010205150B2

United States Patent
Wynn et al.

(10) Patent No.: US 10,205,150 B2
(45) Date of Patent: *Feb. 12, 2019

(54) BATTERY PACK BUS BAR ASSEMBLY WITH SHAPED INTERCONNECT MOUNTING PLATFORMS

(71) Applicant: Atieva, Inc., Menlo Park, CA (US)

(72) Inventors: Nathaniel Wynn, San Mateo, CA (US); Stephan Carl Wintner, San Francisco, CA (US); Richard J. Biskup, Sunnyvale, CA (US); John Louis D'Atri, Redwood City, CA (US)

(73) Assignee: ATIEVA, INC., Menlo Park, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 15/057,183

(22) Filed: Mar. 1, 2016

(65) Prior Publication Data
US 2017/0256770 A1     Sep. 7, 2017

Related U.S. Application Data

(63) Continuation-in-part of application No. 15/057,169, filed on Mar. 1, 2016.

(51) Int. Cl.
*H01M 2/20* (2006.01)
*H01M 2/10* (2006.01)
*H01M 2/16* (2006.01)

(52) U.S. Cl.
CPC ............ *H01M 2/204* (2013.01); *H01M 2/105* (2013.01); *H01M 2/1077* (2013.01); *H01M 2/16* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2006/0057460 A1* | 3/2006 | Matthias | H01M 2/105 429/175 |
| 2011/0091763 A1* | 4/2011 | Park | H01M 2/1077 429/158 |

* cited by examiner

*Primary Examiner* — Wyatt P McConnell
(74) *Attorney, Agent, or Firm* — Patent Law Office of David G. Beck

(57) ABSTRACT

A battery assembly utilizing a compact and robust bus bar configuration is provided. The batteries within the assembly are divided into groups with each group formed from at least two rows of batteries. The batteries within each battery group are connected in parallel and the groups are connected in series. The batteries are interconnected using a plurality of non-overlapping bus bars configured in an alternating pattern with the plurality of battery groups, where each of the bus bars includes multiple interconnect mounting platforms. The interconnect mounting platforms simplify coupling multiple rows of batteries to each bus bar while minimizing bus bar current density variations and insuring that individual interconnect resistance remains relatively low and at about the same level per battery.

17 Claims, 13 Drawing Sheets

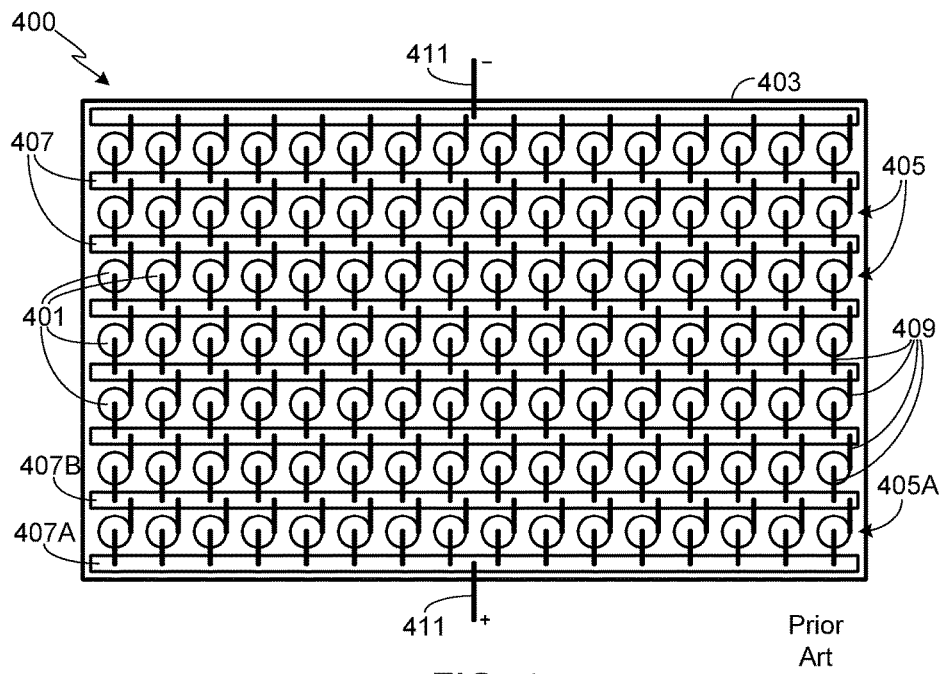
FIG. 4 — Prior Art
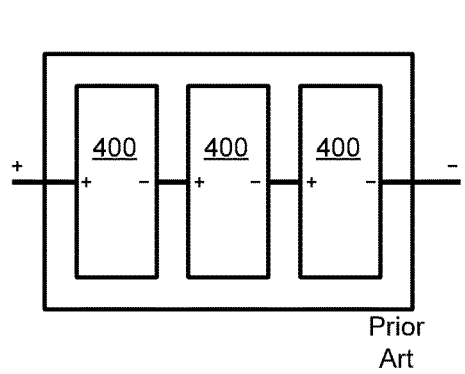
FIG. 5 — Prior Art
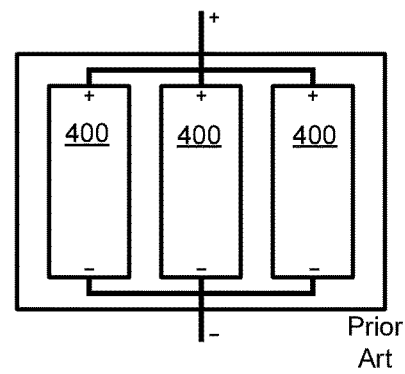
FIG. 6 — Prior Art

BATTERY PACK BUS BAR ASSEMBLY WITH SHAPED INTERCONNECT MOUNTING PLATFORMS

CROSS-REFERENCE TO RELATED APPLICATION

This application is a continuation-in-part of U.S. patent application Ser. No. 15/057,169, filed 1 Mar. 2016, the disclosure of which is incorporated herein by reference for any and all purposes.

FIELD OF THE INVENTION

The present invention relates generally to battery packs and, more particularly, to a robust and compact design for a battery assembly bus bar interconnect system.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. One of the most common approaches to achieving a low emission, high efficiency car is through the use of a hybrid drive train in which an internal combustion engine is combined with one or more electric motors. An alternate approach that is intended to reduce emissions even further while simultaneously decreasing drive train complexity is one in which the internal combustion engine is completely eliminated from the drive train, thus requiring that all propulsive power be provided by one or more electric motors. Regardless of the approach used to achieve lower emissions, in order to meet overall consumer expectations it is critical that the drive train maintains reasonable levels of performance, range, reliability, and cost.

Irrespective of whether an electric vehicle (EV) uses a hybrid or an all-electric drive train, the battery pack employed in such a car presents the vehicle's design team and manufacturer with various trade-offs from which to select. For example, the size of the battery pack affects the vehicle's weight, performance, driving range, available passenger cabin space and cost. Battery performance is another characteristic in which there are numerous trade-offs, such as those between power density, charge rate, life time, degradation rate, battery stability and inherent battery safety. Other battery pack design factors include cost, both per battery and per battery pack, material recyclability, and battery pack thermal management requirements.

In order to lower battery pack cost and thus the cost of an EV, it is critical to reduce both component cost and assembly time. An area of pack fabrication that has a large impact on assembly time, especially for large packs utilizing small form factor batteries, is the procedure used to connect the batteries together, where the batteries are typically grouped together into modules which are then interconnected within the pack to achieve the desired output power. In a conventional pack, the high current interconnects that electrically connect each terminal of each battery to the corresponding bus bar are typically comprised of wire, i.e., wire bonds. Unfortunately wire bonding is a very time consuming, and thus costly, process and one which may introduce reliability issues under certain manufacturing conditions.

Accordingly, what is needed is a robust interconnect system that allows the battery pack to be quickly and efficiently assembled, thus lowering manufacturing time and cost. The present invention provides such an interconnect system.

SUMMARY OF THE INVENTION

The present invention provides a battery assembly comprising (i) a plurality of batteries divided into rows, where each battery includes both a first terminal and a second terminal accessible at a first end portion of the battery, where the plurality of batteries are divided into a plurality of battery groups, where each battery group is comprised of at least two rows of batteries, where the batteries within each battery group are electrically connected in parallel, and where the battery groups are electrically connected in series; and (ii) a plurality of non-overlapping bus bars, preferably of uniform thickness, configured in an alternating pattern with the plurality of battery groups, where the alternating pattern alternates a single bus bar with a single battery group. Each single bus bar of the plurality of non-overlapping bus bars includes (i) a first plurality of interconnect mounting platforms extending at a first non-perpendicular angle from a first edge of the single bus bar, where each of the first plurality of interconnect mounting platforms is arcuately shaped, where each of the first plurality of interconnect mounting platforms is electrically connected to a first subset of the plurality of batteries via the first terminals of the first subset of the plurality of batteries, and where the first subset of the plurality of batteries is comprised of at least four batteries; (ii) a second plurality of interconnect mounting platforms extending at a second non-perpendicular angle from a second edge of the single bus bar, where each of the second plurality of interconnect mounting platforms is comprised of an initial platform portion extending from the second edge of the single bus bar and a pair of platform extensions extending from the initial platform portion, where the initial platform portion is electrically connected to a second subset of the plurality of batteries via the second terminals of the second subset of the plurality of batteries, where the second subset of the plurality of batteries is comprised of at least one battery, where a first platform extension of the pair of platform extensions is electrically connected to a third subset of the plurality of batteries via the second terminals of the third subset of the plurality of batteries, where the third subset of the plurality of batteries is comprised of at least one battery, where a second platform extension of the pair of platform extensions is electrically connected to a fourth subset of the plurality of batteries via the second terminals of the fourth subset of the plurality of batteries, where the fourth subset of the plurality of batteries is comprised of at least one battery.

In one aspect, preferably each of the first plurality of interconnect mounting platforms extending from the first edge of the single bus bar extends beyond a first plane, where the first plane is located midway between the single bus bar and a first adjacent bus bar, where the first adjacent bus bar is adjacent to the first edge of the single bus bar, and where each of the second plurality of interconnect mounting platforms extending from the second edge of the single bus bar extends beyond a second plane, where the second plane is located midway between the single bus bar and a second adjacent bus bar, where the second adjacent bus bar is adjacent to the second edge of the single bus bar.

In another aspect, the first plurality of interconnect mounting platforms and/or the second plurality of interconnect mounting platforms may be fixed to an underlying structure. The underlying structure may be comprised of an electrical insulator positioned between the plurality of batteries and the plurality of non-overlapping bus bars. The underlying structure may be comprised of a battery separator structure. Each interconnect mounting platform may include a mounting aperture, thereby allowing each interconnect mounting platform to be fixed to the underlying structure via the mounting aperture. Each interconnect mounting platform may be fixed to the underlying structure using a technique selected from bonding, staking, clamping or pinning.

In another aspect, the first battery terminal of each battery of the plurality of batteries may be comprised of a crimped edge region integral to the battery casing corresponding to each battery of the plurality of batteries. The second battery terminal of each battery of the plurality of batteries may be comprised of a large contact area terminal nub integrated into a central region of the battery cap assembly.

In another aspect, each bus bar of the plurality of non-overlapping bus bars may further comprise (i) a first plurality of wire bond or ribbon interconnects, where each of the first plurality of interconnect mounting platforms is electrically connected to the first subset of the plurality of batteries by the first plurality of wire bond or ribbon interconnects and (ii) a second plurality of wire bond or ribbon interconnects, where each of the second plurality of interconnect mounting platforms is electrically connected to the second, third and fourth subsets of the plurality of batteries by the second plurality of wire bond or ribbon interconnects.

In another aspect, the battery assembly may further comprise an electrical insulator positioned between the plurality of batteries and the plurality of non-overlapping bus bars. The electrical insulator may be comprised of a tray member, where the plurality of non-overlapping bus bars are attached to an upper surface of the tray member, and where the tray member includes a plurality of apertures that provide access to the first and second terminals of the plurality of batteries. Alternately, the electrical insulator may be comprised of an electrically insulative layer attached to a lower surface of at least a portion of the plurality of non-overlapping bus bars.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 4 provides a top view of a battery module utilizing a series of non-overlapping bus bars of alternating polarity in accordance with the prior art;

FIG. 5 provides a schematic diagram of a battery pack utilizing a plurality of the battery modules shown in FIG. 4 combined in a series configuration;

FIG. 6 provides a schematic diagram of a battery pack utilizing a plurality of the battery modules shown in FIG. 4 combined in a parallel configuration;

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations or components, these steps, calculations or components should not be limited by these terms, rather these terms are only used to distinguish one step, calculation or component from another. For example, a first calculation could be termed a second calculation, and, similarly, a first step could be termed a second step, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of batteries electrically interconnected to achieve the desired voltage and capacity, where the battery assembly may be contained within a battery pack enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
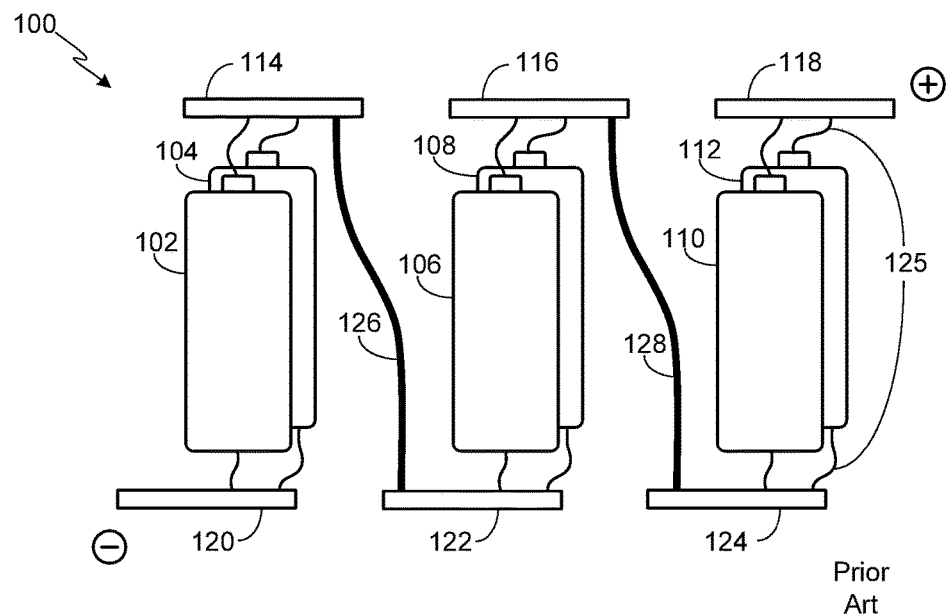
FIG. 1 provides a schematic diagram of a battery pack with bus bars above and below the battery cells in accordance with the prior art.

FIG. 1 illustrates a portion of an exemplary battery pack 100 utilizing a conventional battery pack configuration in which the battery interconnects (e.g., wire bonds) are attached to both the upper and lower portions of the batteries. As shown, battery pack 100 includes a first group of batteries 102 and 104 connected in parallel, a second group of batteries 106 and 108 connected in parallel, and a third group of batteries 110 and 112 connected in parallel. The first, second and third groups of batteries are connected in series. Bus bars 114, 116, 118, 120, 122, 124 are used to connect the batteries in this parallel and series arrangement. Each of the bus bars is coupled to the respective batteries with one or more interconnects 125 (e.g., wire bonds). A relatively thick wire 126 couples the second bus bar 114 to the third bus bar 122, making a series connection between the first and second battery groups, while a second relatively thick wire 128 couples the fourth bus bar 116 to the fifth bus bar 124, making a series connection between the second and third battery groups. As a result, the first bus bar 120 is the negative terminal while the sixth bus bar 118 is the positive terminal for battery pack 100.

The use of bus bars at both ends of the batteries as illustrated in FIG. 1 requires a relatively complex manufacturing process in order to (i) attach the battery interconnects 125 between the battery end surfaces and the bus bars, and (ii) attach the wires (e.g., wires 126 and 128) that couple the upper bus bars to the lower bus bars. Wires 126 and 128 are also problematic in the sense that they can introduce parasitic resistance into the current path, which in turn can introduce a voltage drop under high current drain conditions. Additionally this configuration prevents, or at least limits, the ability to efficiently remove battery pack heat by affixing a heat sink to a battery end surface.

Figure 2:
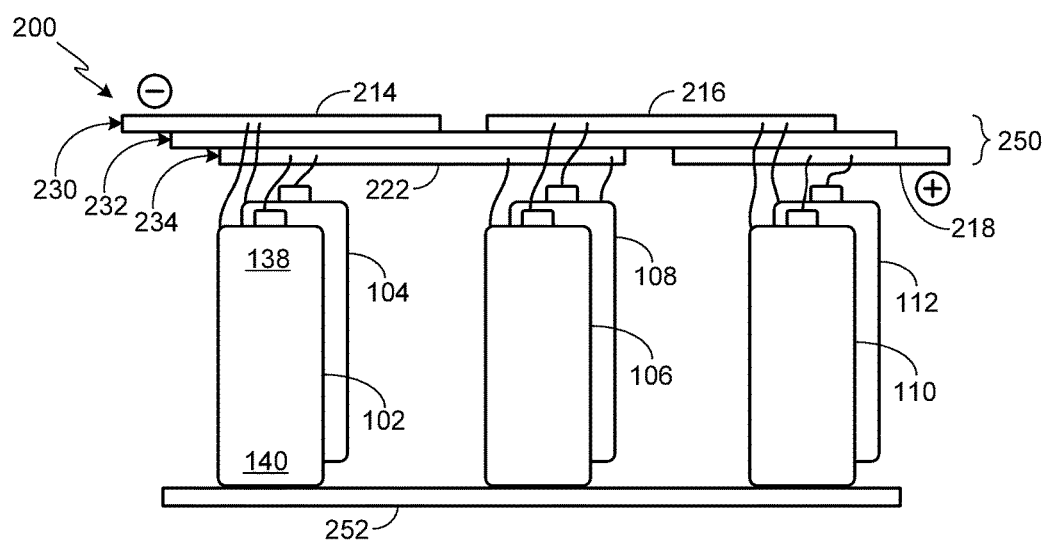
FIG. 2 provides a schematic diagram of a battery pack with both bus bars adjacent to one end of each of the battery cells in accordance with the prior art.

FIG. 2 illustrates a portion of a battery pack 200 utilizing an alternate battery pack configuration in which all the bus bars are proximate to one end of the battery pack, thus enabling efficient heat removal from the other end of the battery pack. Furthermore, by locating bus bars 214, 216, 218 and 222 proximate to one end of the batteries, fewer bus bars are required than in battery pack 100. The relatively thick wires 126 and 128 from the upper bus bars to the lower bus bars are also eliminated in the embodiment shown in FIG. 2.

Access to both the positive and negative terminals in battery pack 200 is at one end of the cells, i.e., at the top end of the cells, where the bus bars are coupled to the positive and negative terminals using battery interconnects (e.g., wire bonds). As in the prior arrangement, the first group of batteries 102 and 104 are connected in parallel, the second group of batteries 106 and 108 are connected in parallel, and the third group of batteries 110 and 112 are connected in parallel. The first, second and third groups of batteries are connected in series. Bus bars 214, 216, 218, 222 are used to couple the batteries in this parallel and series arrangement. Specifically, starting with the negative terminal of battery pack 200, a first bus bar 214 is connected to the negative terminals of the first group of batteries 102 and 104 while a second bus bar 222 is connected to the positive terminals of the same group of batteries 102 and 104, both at the top end portion 138 of each of the batteries. The first and second bus bars 214 and 222 couple the first group of batteries 102 and 104 in parallel. Similarly, the second bus bar 222 and the third bus bar 216 couple the second group of batteries 106 and 108 in parallel, while the third bus bar 216 and the fourth bus bar 218 couple the third group of batteries 110 and 112 in parallel. Series connections between battery groups are formed by the bus bars, specifically the second bus bar 222 connects the positive terminals of the first group of batteries 102 and 104 to the negative terminals of the second group of batteries 106 and 108; and the third bus bar 216 connects the positive terminals of the second group of batteries 106 and 108 to the negative terminals of the third group of batteries 110 and 112. The fourth bus bar 218 is the positive terminal of the battery pack 200.

In battery pack 200 the bus bars are arranged in a layer stack 250. In this stacking arrangement first bus bar 214 and third bus bar 216, which are separated by an air gap or other electrical insulator to prevent short circuiting, are placed in a first layer 230. Similarly, second bus bar 222 and fourth bus bar 218, which are also separated by a gap or insulator, are placed in a third layer 234. Disposed between layers 230 and 234 is an electrically insulating layer 232. To simplify fabrication, the layer stack may be formed using layers of a circuit board, e.g., with the bus bars made of (or on) copper layers or other suitable conductive metal (such as aluminum) and the insulating layer made of resin impregnated fiberglass or other suitable electrically insulating material.

The batteries shown in FIGS. 1 and 2, as well as the batteries used in the preferred embodiment of the invention, have a projecting nub as a positive terminal at the top end of the battery and a can, also referred to as a casing, that serves as the negative battery terminal. The batteries are preferably cylindrically shaped with a flat bottom surface (e.g., a battery utilizing an 18650 form factor). Typically a portion of the negative terminal is located at the top end of the cell, for example due to a casing crimp which is formed when the casing is sealed around the contents of the battery. This crimp or other portion of the negative terminal at the top end of the battery provides physical and electrical access to the battery's negative terminal. The crimp is spaced apart from the peripheral sides of the projecting nub through a gap that may or may not be filled with an insulator.

Preferably in a battery pack such as battery pack 200 in which the battery connections are made at one end of the cells (e.g., end portions 138), a heat sink 252 is thermally coupled to the opposite end portions 140 of each of the batteries. This approach is especially applicable to a co-planar battery arrangement which provides a relatively flat surface to attach a heat sink. Heat sink 252 may be finned or utilize air or liquid coolant passages. If heat sink 252 is air cooled, a fan may be used to provide air flow across one or more heat sink surfaces. In some configurations, heat sink 252 may be attached or affixed to the bottom of a battery holder.

In a typical battery pack in which all battery interconnects are attached to one end of the cells, typically a multi-layer stack (e.g., stack 250) is used in order to provide bus bars for both terminals as well as a suitable insulator located between the bus bars. This approach results in a relatively complex bus bar arrangement. For example, FIG. 3 from co-assigned U.S. patent application Ser. No. 14/203,874, the disclosure of which is incorporated herein for any and all purposes, illustrates a multi-layer bus bar configuration in which the bus bars are stacked with an interposed insulator, and in which each bus bar includes multiple contact fingers 301.

In order to simplify bus bar design and configuration, thereby significantly reducing material and fabrication costs as well as overall battery pack complexity, the battery pack of the present invention may utilize a series of non-overlapping bus bars of alternating polarity. Such a configuration is disclosed in co-assigned U.S. patent application Ser. No. 14/802,207, filed 17 Jul. 2015, the disclosure of which is incorporated herein for any and all purposes. Although this approach may be used throughout the entire battery pack, preferably it is used to form battery modules, where the battery modules are then electrically coupled to form the battery pack. Assuming the battery pack is used in an electric vehicle as preferred, the individual battery modules may be contained within a single battery pack enclosure, or within multiple enclosures, the latter approach allowing subsets of modules to be distributed throughout the vehicle in order to obtain a particular weight distribution or to fit within the confines of a particular vehicle envelope or structure.

FIG. 4 provides a top view of a battery module 400 utilizing a series of non-overlapping bus bars of alternating polarity in accordance with the prior art. Visible in FIG. 4 is the end portion of each of a plurality of batteries 401, where the end portions are accessible through corresponding apertures in an upper tray member 403. Tray member 403 is prepared and/or treated to provide electrical isolation between the batteries, for example by fabricating the tray member from an electrically insulative material such as a plastic, or coating the tray member with an electrically insulative material. The batteries are divided into a plurality of rows 405, where each row 405 includes sixteen batteries 401. Even though module 400 is shown with seven rows 405, it should be understood that this design is not limited to configurations utilizing this number of battery rows, and therefore is equally applicable to configurations utilizing a fewer number, or a greater number, of battery rows 405. Similarly, the design is not limited to configurations in which each battery row is comprised of sixteen batteries, rather the design may be used with configurations using a fewer number, or a greater number, of batteries 401 per battery row 405.

Figure 3:
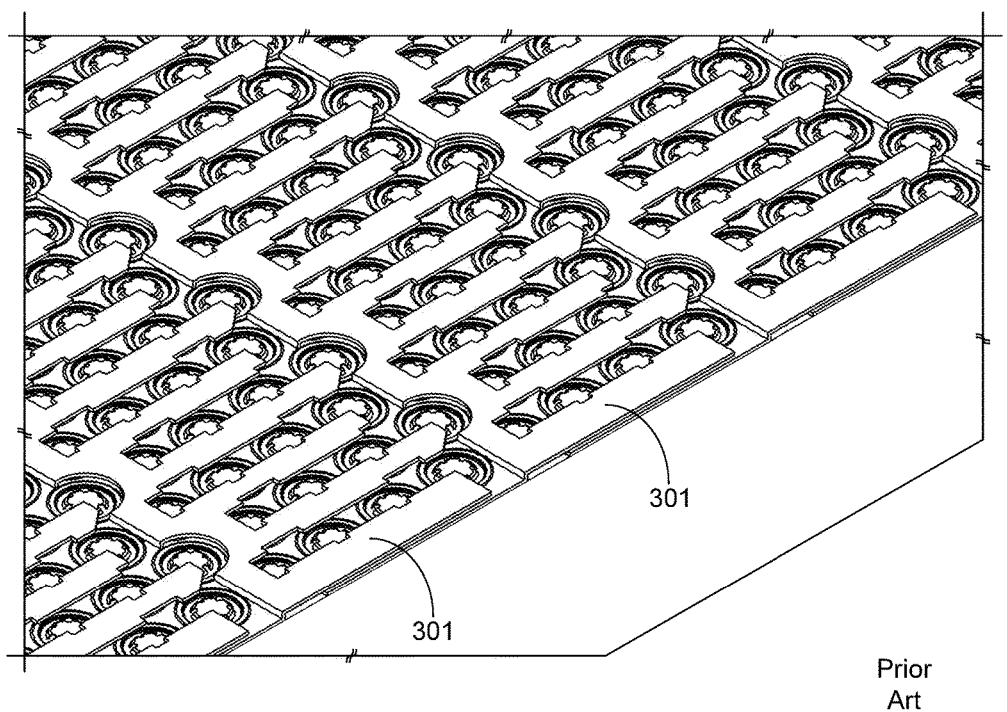
FIG. 3 provides a detailed perspective view of the bus bars in a particular layer stack configuration in accordance with the prior art.

In the prior art configuration illustrated in FIG. 4, interposed between battery rows 405 are linear bus bars 407, where each bus bar 407 is devoid of the contact fingers utilized in the prior art approach shown in FIG. 3. It should be understood that bus bars 407 may utilize a non-linear configuration. For example, if each row of batteries 401 is arranged in a non-linear fashion, the bus bars may utilize a similar shape (e.g., the zig-zag arrangement disclosed in U.S. patent application Ser. No. 14/802,207). Bus bars 407 are preferably made of copper, although other suitable electrically conductive materials such as aluminum may be used. Although this approach may utilize any battery type that provides access to both terminals at a single end portion of the battery, in the illustrated assembly batteries 401 are cylindrical, preferably utilizing an 18650 form factor.

The batteries within a single row 405 form a group with all terminals of a first polarity being electrically connected to a single bus bar on one side of the battery row, and all terminals of the second polarity being electrically connected to a single bus bar on the other side of the battery row. For example, all positive terminals of battery row 405A are electrically connected to bus bar 407A and all negative terminals of battery row 405A are electrically connected to bus bar 407B. As a result of this approach, each group of batteries represented by a single row are electrically connected in parallel while the battery rows within a single module 400 are electrically connected in series. By varying the number of batteries within a single row, as well as the number of rows within a single module, the desired voltage and current capabilities of the module may be configured as desired to meet the design criteria for a specific application.

Preferably module 400 uses wire bond interconnects 409 to electrically couple the batteries 401 to the bus bars 407. Wire bond interconnects 409 may be attached using any wire bonding technique suitable for the selected wire gauge, wire material and bus bar material. Typical wire bonding techniques include, but are not limited to, bonding, resistance bonding, thermocompression bonding, thermosonic bonding and laser bonding.

As previously noted, module 400 may be configured as the entire battery pack. For some applications, however, multiple modules 400 may be electrically interconnected in order to achieve the desired battery pack output characteristics. For example, modules 400 may be electrically interconnected in series as illustrated in FIG. 5, or electrically interconnected in parallel as illustrated in FIG. 6. Other series/parallel arrangements may be used with the invention.

Figure 7:
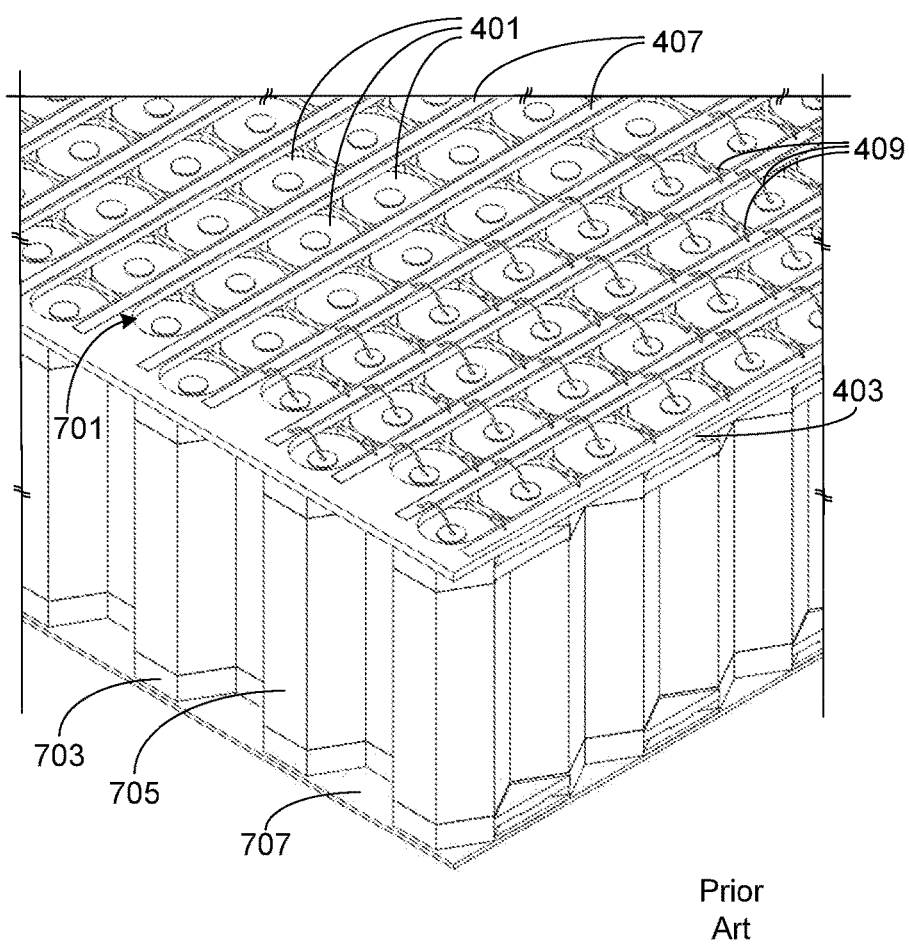
FIG. 7 provides a perspective view of a portion of a battery module such as that shown in FIG. 4.

FIG. 7 provides a perspective view of a portion of a battery module utilizing the bus bar arrangement shown in FIG. 4. For clarity only a portion of the illustrated batteries shown in FIG. 7 are interconnected to adjacent bus bars. This figure shows a clearer view of the access apertures 701 fabricated into upper tray member 403, apertures 701 allowing access to the battery terminals located at the ends of the batteries. The access apertures 701 utilized in the illustrated embodiment are continuous slots that provide easy electrical access to all of the batteries within a single row while still holding the batteries in place. Thus in this configuration there is a single access aperture per battery group. It should be understood, however, that access apertures 701 may utilize an alternate shape and may be configured to allow access to more or less than a battery group. For example, the access apertures may be configured with a circular or elliptical shape with one opening per battery, or one opening per sub-group of batteries (e.g., two or more batteries).

In the arrangement illustrated in FIG. 7, upper tray member 403, which may be molded, cast, printed using a 3D printer, or fabricated using an alternate technique, is preferably fabricated from a plastic material (e.g., polycarbonate, acrylonitrile butadiene styrene (ABS), polypropylene (PP), polyethylene (PE), polyethylene terephthalate (PET), nylon, etc.), although other materials may also be used to fabricate the tray member. Preferably bus bars 407 are integrated into upper tray member 403, for example by molding the bus bars into the tray member during tray member fabrication. Alternately, bus bars 407 may be bonded into slots that are molded into the upper tray member 403. Integrating the bus bars into a member, such as the upper surface of tray member 403, insures that the bus bars are properly positioned during the battery interconnection process and that they remain in position after pack fabrication, thus minimizing stress and damage to the battery interconnects.

Figure 8:
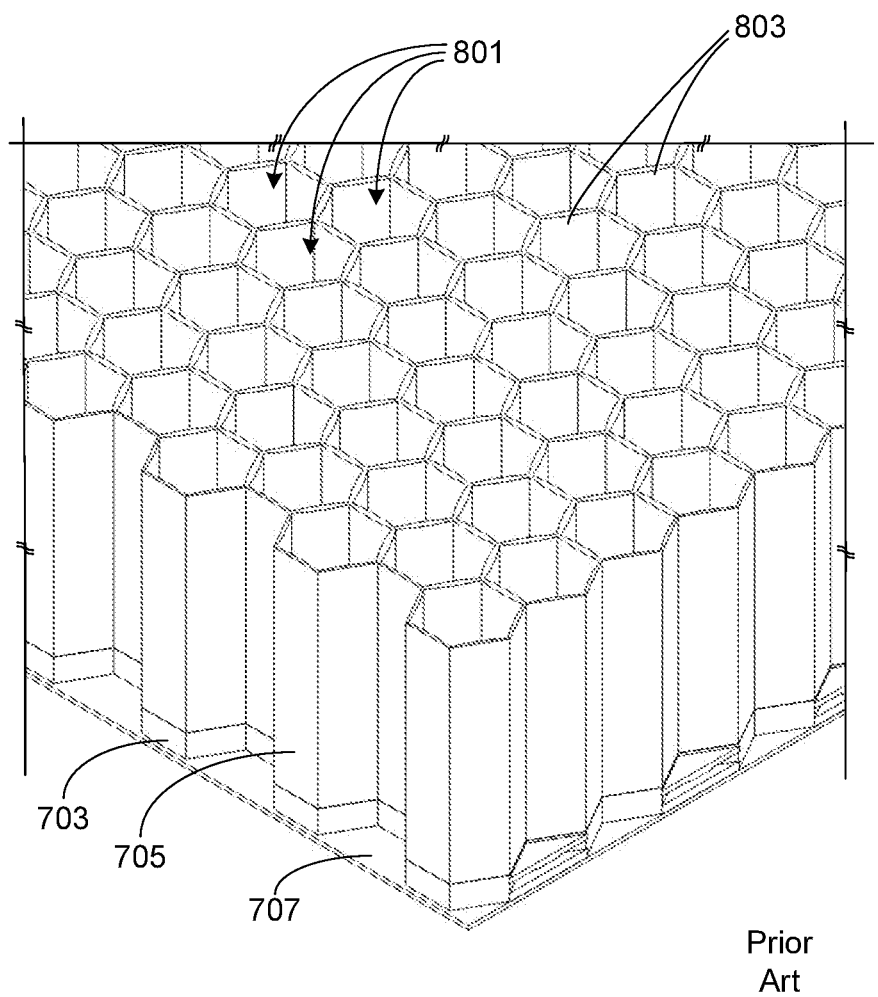
FIG. 8 provides a perspective view of the same portion of the battery module as shown in FIG. 7, with the upper tray member as well as the batteries removed.

Although the invention may use any of a variety of techniques to position the batteries within the pack, or module, the prior art configuration illustrated in FIGS. 4 and 7 utilizes a lower tray member 703, a battery separating member 705 and a heat spreader 707. These aspects are highlighted in FIGS. 7 and 8. It will be appreciated that the configuration of members 701, 703 and 705 assume the use of cylindrical cells, and therefore the use of an alternate form factor for batteries 401 would require the redesign of members 701, 703 and 705. Heat spreader 707 is fabricated from a thermally conductive material, such as aluminum, with a thermal conductivity of at least 100 Wm$^{-1}$K$^{-1}$.

Separating member 705 is fabricated from an electrically insulating material, preferably a plastic such as a polycarbonate, acrylonitrile butadiene styrene (ABS), polypropylene (PP), polyethylene (PE), polyethylene terephthalate (PET), or nylon. Preferably member 705 is fabricated using an extrusion process, although alternate fabrication techniques may be used such as molding, casting or printing using a 3D printer. In the illustrated configuration, each battery 401 is held within its own cavity 801 within separating member 705. The walls 803 of each battery cavity 801 may utilize any of a variety of shapes, such that each cavity may have either a circular or a non-circular cross-section. Preferably and as illustrated, each battery cavity 801 is fabricated with a six-sided shape in which the six sides are of equal length (i.e., a six-sided, regular shape). Each wall 803 may be straight; alternately, each wall 803 may be curved outwardly away from the cavity center line; alternately, each wall 803 may be curved inwardly towards the cavity center line as shown.

Enclosing each battery within a six-sided, regular cavity, and more preferably a six-sided, regular cavity in which the cavity walls 803 curve inwardly towards the corresponding cavity center line as shown, provides several benefits. First, the cavities prevent the batteries from accidentally touching one another, either during battery pack fabrication and assembly or once the battery pack is installed. Assuming that the battery pack is installed in an electric vehicle, separating member 705 also helps to prevent battery shorting if the battery pack is damaged during a collision. Second, the use of a six-sided, regular cavity rather than a cavity with a circular cross-section simplifies battery pack assembly since the six-sided shape provides additional fitting flexibility, thereby allowing the fabrication tolerances for both the batteries and the separating member to be looser than would otherwise be required. Third, the air space provided by the six-sided battery cavities improves battery-to-battery thermal isolation. Fourth, the contraction and expansion that batteries often exhibit during thermal cycling is more easily handled by a six-sided cavity rather than a circularly-shaped cavity. Fifth, the space between the corners of a six-sided cavity and a cylindrically-shaped battery provide venting pathways if the battery vents through its side, for example during a thermal runaway event.

Figure 9:
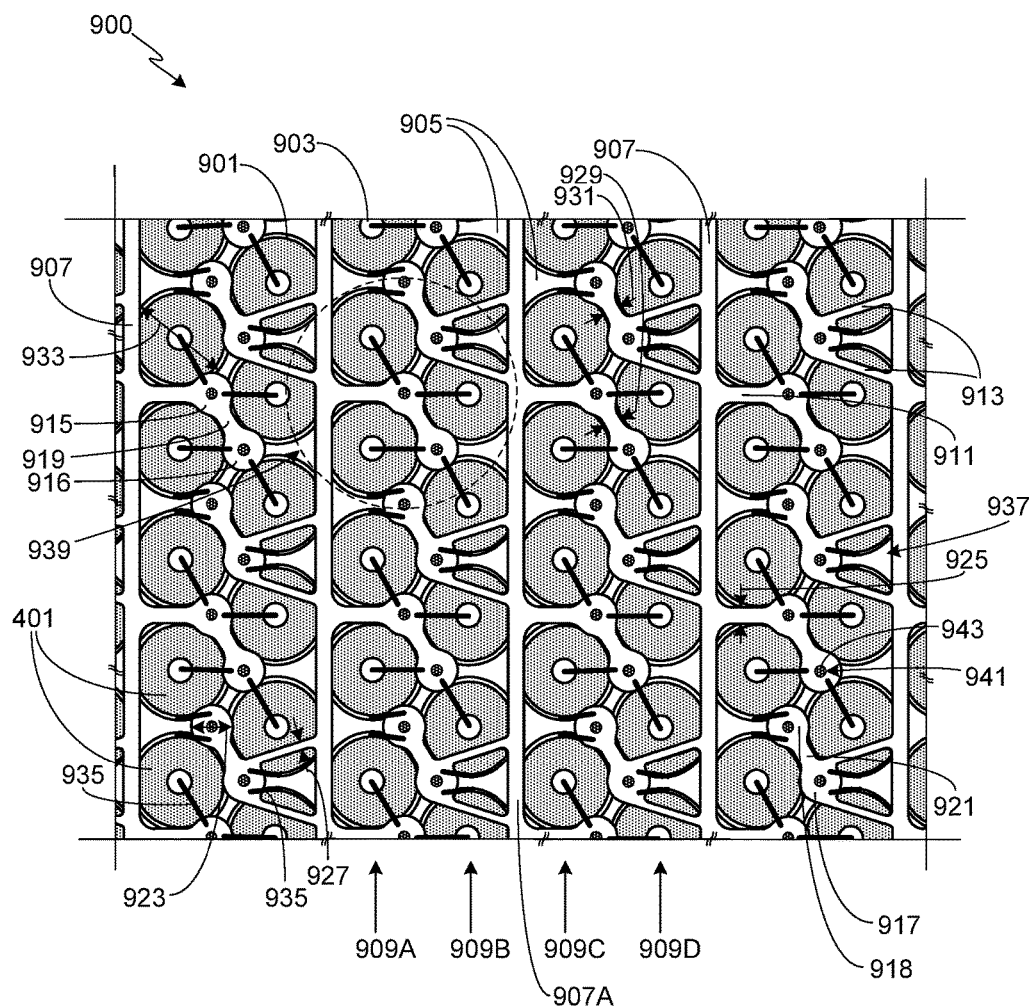
FIG. 9 provides a top view of a battery module utilizing a series of non-overlapping bus bars with the interconnect mounting platforms of the present invention.

FIG. 9 provides a top view of a portion 900 of a battery pack, or battery pack module, configured in accordance with a preferred embodiment of the invention. Visible in this figure is the end portion of each of a plurality of batteries 401, where the batteries are positioned to provide access to both a portion of the battery casing (e.g., casing crimp edge 901), which serves as one battery terminal (e.g., the negative battery terminal), and to the central battery terminal nub 903, which serves as the second battery terminal (e.g., the positive battery terminal). A separator 905 prevents battery casings from touching adjacent casings, thereby insuring the desired level of electrical isolation between cells. Separator 905 may be comprised of electrically non-conductive filler, for example an electrically non-conductive epoxy injected into the pack after the batteries are properly positioned. Alternately separator 905, which may be similar to the structure described above relative to assembly 400, can be pre-fabricated prior to battery insertion into the pack/module, for example using a fabrication process such as molding, casting, extrusion, 3D printing, etc., and comprised of a suitable electrically non-conductive material such as plastic (e.g., polycarbonate, acrylonitrile butadiene styrene (ABS), polypropylene (PP), polyethylene (PE), polyethylene terephthalate (PET), nylon, etc.).

As shown in FIG. 9, battery pack/module 900 includes a plurality of non-overlapping bus bars 907 arranged in an alternating polarity configuration, where each of the bus bars includes multiple interconnect mounting platforms as described in detail below. In the exemplary embodiment, bus bars 907 are of uniform thickness and fabricated from an electrically conductive material such as aluminum or copper. Preferably bus bars 907 are interposed between every two rows of batteries 401 as shown (i.e., one bus bar per every two rows of batteries). Thus, for example, the batteries within rows 909A and 909B form a first group of batteries and the batteries within rows 909C and 909D form a second group of batteries. In this configuration all battery terminals of a first polarity corresponding to one group of batteries and all battery terminals of a second polarity corresponding to another group of batteries are electrically connected to a single bus bar. Therefore in FIG. 9 the casing battery terminals 901 (e.g., the negative polarity terminals) corresponding to battery rows 909A and 909B and the central nub terminals 903 (e.g., the positive polarity terminals) corresponding to battery rows 909C and 909D are all electrically connected to bus bar 907A. Using this connection configuration, each group of batteries represented by two rows of batteries are electrically connected in parallel while the battery groups are electrically connected in series. By varying the number of batteries per battery group, as well as the number of battery groups within a single module (or pack), the desired voltage and current capabilities may be configured as desired to meet the design criteria of the intended application.

Figure 10:
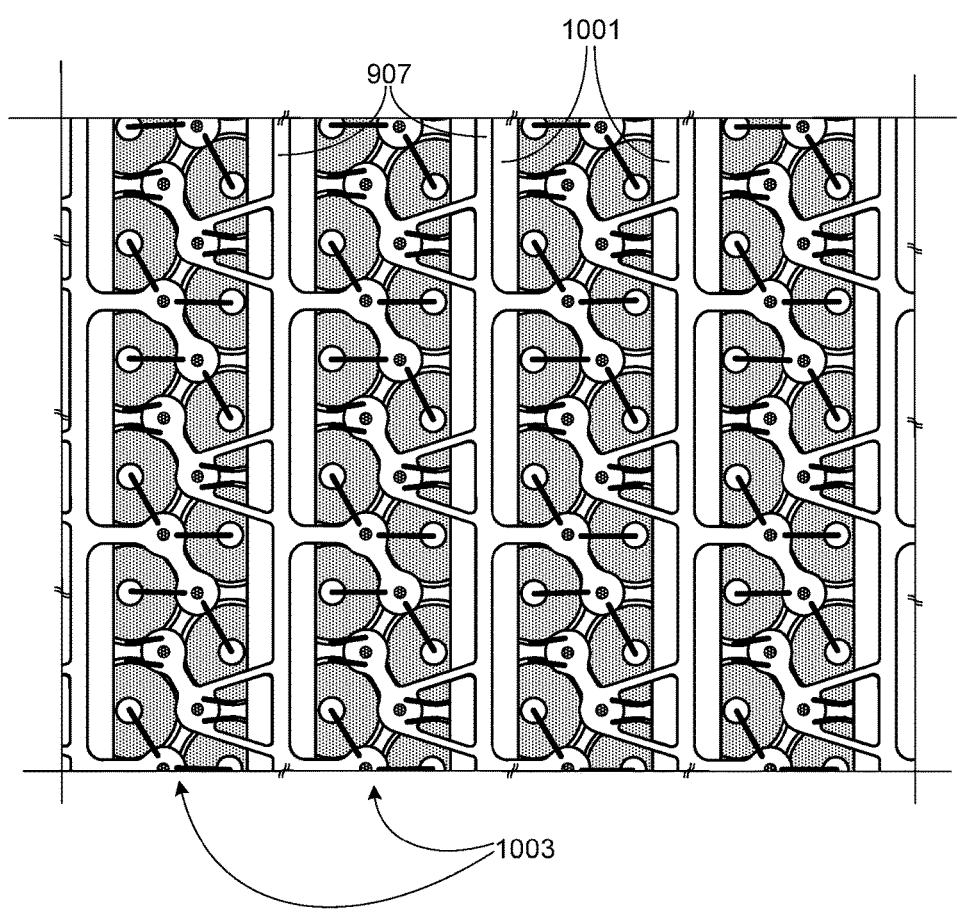
FIG. 10 provides a top view of the battery module shown in FIG. 9 with the inclusion of an electrically non-conductive separator interposed between the bus bar assembly and the batteries.

In order to insure clarity, FIG. 9 does not show an electrical insulator positioned between bus bars 907 and batteries 401. It will be appreciated, however, that the bus bars cannot be allowed to inadvertently make electrical contact with either battery terminal. Accordingly, an electrically insulating layer is interposed between the bottom surface of bus bars 907 and the batteries. In one configuration, and as illustrated in FIG. 10, bus bars 907 are electrically isolated from batteries 401 with an upper tray member 1001, where upper tray member 1001 is similar to previously described tray member 403. In order to provide the desired electrical isolation, tray member 1001 is fabricated from an electrically insulative material such as a plastic (e.g., polycarbonate, acrylonitrile butadiene styrene (ABS), polypropylene (PP), polyethylene (PE), polyethylene terephthalate (PET), nylon, etc.), or the member is coated (e.g., at least the bottom surface of the tray member) with an electrically insulative material. Tray member 1001 includes a plurality of access apertures 1003 that provide access to the underlying battery terminals, thus allowing the interconnect mounting platforms of the bus bars to be electrically connected to the battery terminals via a plurality of interconnects as described below. Access apertures 1003 may be formed as continuous slots, as illustrated in FIG. 10, thereby providing easy electrical access to all of the batteries within two adjacent rows of batteries. It should be understood, however, that access apertures 1003 may utilize an alternate shape (e.g., circular, elliptical, etc.) and may be configured to allow access to more or less batteries than the access apertures shown in FIG. 10. Bus bars 907 may be integrated into tray member 1001, for example by molding the bus bars into the tray member during tray member fabrication; alternately, bus bars 907 may be bonded into regions molded into the tray member 1001; alternately, bus bars 907 may be bonded or otherwise attached to the top surface of tray member 1001. Integrating or otherwise attaching bus bars 907 to member 1001 insures that the bus bars are properly positioned during the battery interconnection process, and that the bus bars do not move after battery pack fabrication as such movement would stress, and potentially damage, the battery interconnects.

Figure 11:
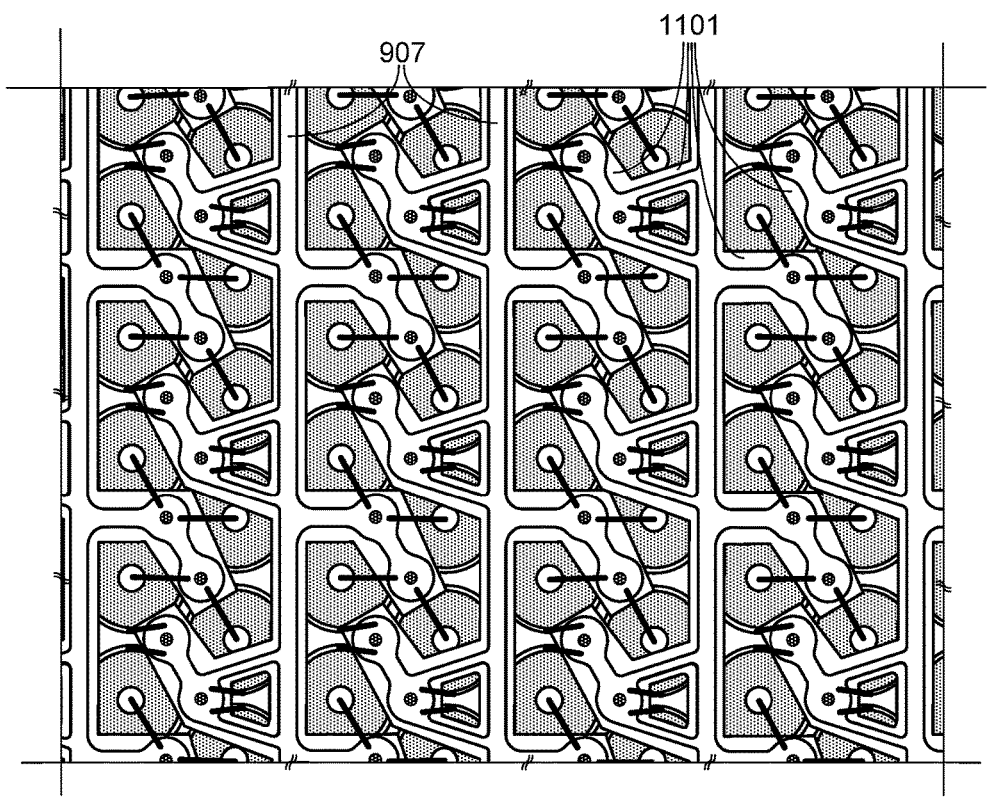
FIG. 11 provides a top view of the battery module shown in FIG. 9 with the inclusion of an electrically non-conductive separator layer attached to the lowermost surface of the bus bar assembly.

FIG. 11 illustrates an alternate configuration for electrically isolating bus bars 907 from the underlying batteries. As shown, an electrical insulator 1101 is applied to the bottom surface of the bus bars as well as the associated interconnect mounting platforms and coupling segments described below. As with the approach described relative to FIG. 10, the approach used in this configuration not only prevents inadvertent shorting between the bus bars and the batteries, but also helps to stabilize the bus bars, thereby insuring proper bus bar placement and minimal strain on the interconnects due to bus bar movement after pack fabrication. Preferably this approach uses a layer stacking fabrication technique, for example by stacking the bus bars onto an electrically insulating layer of resin impregnated fiberglass or other suitable electrically insulating material.

As shown in FIG. 9, extending from both edges of each bus bar 907 are electrical coupling segments 911 and 913. More specifically, a first plurality of electrical coupling segments 911, which extend from a first edge of each bus bar 907, provides an electrical connection between each central bus bar segment 907 and each corresponding interconnect mounting platform 915. Similarly, a second plurality of electrical coupling segments 913, which extend from a second edge of each bus bar 907, provides an electrical connection between each central bus bar segment 907 and each corresponding interconnect mounting platform 917. In the illustrated embodiment, a third plurality of electrical coupling segments 919 provides an electrical connection between serially configured interconnect mounting platforms 915 and 916 while a fourth plurality of electrical coupling segments 921 provides an electrical connection between serially configured interconnect mounting platforms 917 and 918. Note that in this embodiment, other than for platform location relative to a corresponding bus bar, mounting platforms 915-918 are substantially equivalent.

Interconnect mounting platforms 915-918 have a larger width 923 than the width 925 of coupling segments 911 or the width 927 of coupling segments 913 or the width 929 of coupling segments 919 or the width 931 of coupling segments 921. In the illustrated and preferred embodiment, the width 923 of each mounting platform 915-918 is between one third and one half the diameter 933 of battery 401, although it should be understood that the invention may use other platform widths. Preferably interconnect mounting platforms 915-918 have a substantially circular cross-section, circular except for the junction between the mounting platform and the corresponding coupling segments as shown.

As described above, in the preferred embodiment there are two rows of batteries, also referred to herein as a battery group, per bus bar 907. The use of interconnect mounting platforms 915-918 provides a means of achieving this configuration while minimizing bus bar current density variations and insuring that individual interconnect resistance remains relatively low and at about the same level per battery. For example in the preferred embodiment, interconnect resistance is about 30% of battery internal resistance and the bus bar current density only varies by a factor of approximately two. As a result, variations in battery aging and discharge rate are minimal.

Interconnect mounting platforms 915-918 simplify battery pack (or module) fabrication by providing large areas to which the battery interconnects are attached. Preferably the interconnects 935 that electrically couple terminals 901 and 903 of batteries 401 to bus bars 907 via interconnect mounting platforms 915-918 are comprised of wire bonds. If desired, each wire bond interconnect may be comprised of a fusible interconnect, i.e., an interconnect with a large enough diameter to allow it to carry the desired current while having a small enough diameter to insure that it will break when the desired current is exceeded by a preset amount. The wire bond interconnects may be attached using any wire bonding technique suitable for the selected wire gauge, wire material and bus bar material. Typical wire bonding techniques include, but are not limited to, ultrasonic bonding, resistance bonding, thermocompression bonding and thermosonic bonding.

While wire bond interconnects offer a number of benefits, for example the ability to use the wire bond as a fusible link, this type of interconnect suffers from several drawbacks, the primary drawback being the time, and thus cost, required to couple the wire to the crimped region of the battery. This problem, which is common when the battery pack design requires that both interconnects be coupled to the top portion of the batteries, is due to the limited diameter of the wire and the limited area offered by the crimped battery case (i.e., regions 901). When coupling the wire to the crimped region of a battery, i.e., the edge of the battery case, the pattern recognition system used in a conventional wire bonding machine may take longer than desired to align the wire with the crimped region due to the small feature sizes. Additionally, due to the limited bonding area, this bond may be more prone to failure, potentially requiring re-bonding to correct the failed bond.

Due to the issues relating to attaching wire bond interconnects to the crimped region of the battery casings, in at least one embodiment of the invention ribbon interconnects (i.e., an interconnect with a substantially rectangular cross-section) are used to couple the relatively small crimped edge region 901 of each battery 401 to the corresponding mounting platform. Even though the crimped edge region 901 of each battery 401 is relatively small and often includes size variations that result from the standard manufacturing tolerances used by battery manufacturers, the large surface area offered by the ribbon interconnects allow these interconnects to be rapidly and efficiently bonded to the crimped edge of the corresponding battery casings. The ribbon interconnects, if used, may be attached using any conventional fiber bonding technique suitable for the selected wire gauge, wire material and bus bar material. Exemplary coupling techniques include laser welding (e.g., laser oscillation welding, laser micro welding), e-beam welding, resistance welding, ultrasonic bonding, thermosonic bonding, and thermocompression bonding. While ribbon interconnects may also be used to couple the battery terminal nubs 903 to the corresponding mounting platforms, in at least one embodiment wire bond interconnects are used for the battery terminal nubs 903 and ribbon interconnects are used for the battery crimped regions 901.

In the preferred and illustrated embodiment, a singular coupling segment 911 provides the necessary electrical connection between the central bus bar segment 907 and each of the corresponding interconnect mounting platforms 915 connected to terminal nubs 903. In contrast, in this embodiment a pair of coupling segments 913 provides the necessary electrical connection between the central bus bar segment 907 and each of the corresponding interconnect mounting platforms 917 connected to crimped battery case regions 901. The use of a pair of coupling segments, rather than a single coupling segment, provides a large open region 937, thereby increasing access to the underlying battery edge 901 and simplifying the process of attaching interconnects to this region.

Figure 12:
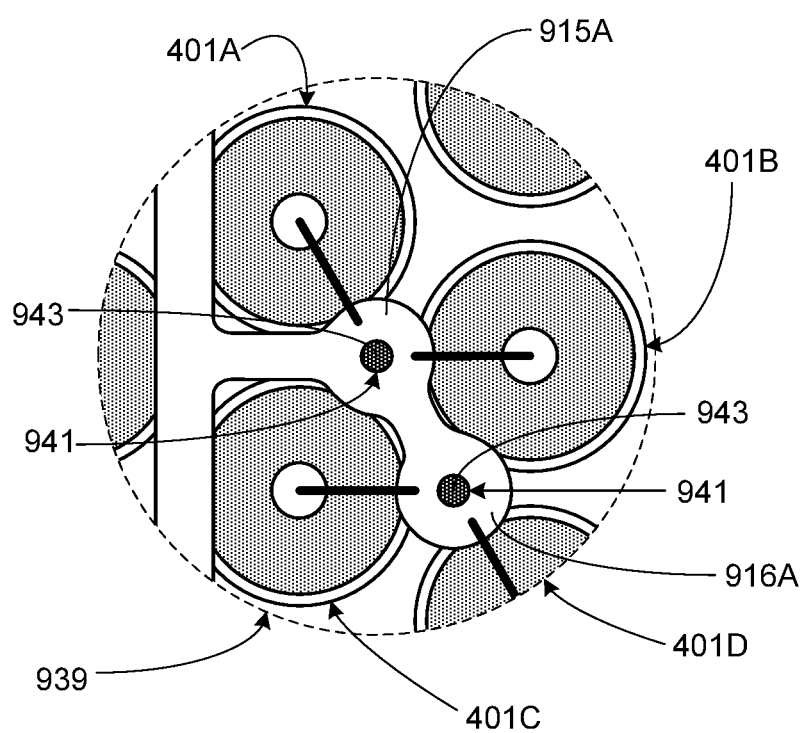
FIG. 12 provides additional detail regarding the location of an interconnect mounting platform relative to the underlying batteries.

Preferably and as shown, each interconnect mounting platform 915-918 is centered over the approximate center of the space (i.e., void) between three adjacent batteries, where two of the three adjacent batteries is preferably connected, via interconnects, to the mounting platform in question. This aspect of the preferred embodiment is illustrated in FIG. 12, where FIG. 12 provides an enlarged view of section 939 of FIG. 9. For clarity, this figure only includes a single coupling segment 911 and the corresponding interconnect mounting platforms 915A and 916A. As shown in FIG. 12, and in accordance with the preferred embodiment of the invention, the center of mounting platform 915A is positioned approximately over the center of the space between batteries 401A-401C and the center of mounting platform 916A is positioned approximately over the center of the space between batteries 401B-401D. By centering the mounting platform as described, each battery terminal (i.e., case edge 901 or nub 903) is equally accessible during the interconnect attachment process, thus insuring that each interconnect can be properly placed and attached to the underlying battery terminal.

In order to minimize the potential for interconnect damage, preferably each interconnect mounting platform is rigidly fixed to an underlying structure. While the interconnect mounting platforms may be fixed to an electrical insulator positioned between bus bars 907 and batteries 401, e.g., tray member 1001 or insulator 1101, preferably the interconnect mounting platforms are rigidly fixed to separator structure 905. Fixing each mounting platform to separator 905 is preferred regardless of whether the separator is comprised of a filler or comprised of a pre-fabricated structure, both of which are described above. The mounting platforms may be bonded, staked, clamped, pinned, or otherwise fixed to separator 905 (or to an electrical insulator such as members 1001 and 1101). In the illustrated embodiment, each mounting platform 915-918 includes a hole 941 that is preferably centered on the corresponding platform. A heat stake 943 is then used to fix the platform to separator 905. Rigidly fixing the mounting platforms to the separator, or insulator, helps to minimize platform movement, thereby minimizing the potential for interconnect damage after battery pack fabrication is complete and the pack is in use, for example as the battery pack of an EV.

FIGS. 13-16 illustrate an alternate preferred embodiment of the invention utilizing many of the design features of the previous embodiment. As shown in the top view of FIG. 13, batteries 401 are situated as previously described, specifically positioned to provide access via one end to both terminals of each battery, e.g., casing crimp edge 901 and central battery nub 903. Accidental contact between batteries is prevented using separator 905. Battery pack (or battery module) 1300 includes a plurality of non-overlapping bus bars 1301 arranged in an alternating polarity configuration, where each of the bus bars includes multiple interconnect mounting platforms as described in detail below. Bus bars 1301 are preferably fabricated from aluminum or copper and are of uniform thickness.

Although pack/module 1300 can be configured to function with battery groups of various sizes, the inventors have found that the optimal configuration interposes one bus bar 1301 between every two rows of batteries as shown. It should be understood, however, that the invention may use other sizes of battery groupings, for example interposing bus bars between every three rows of batteries.

Extending at a non-perpendicular angle from both edges of each bus bar 1301 are interconnect mounting platforms that are designed to simplify interconnect attachment procedures while minimizing bus bar current density variations and insuring that individual interconnect resistance remains relatively low and at about the same level per battery. As visible in the portion of the battery pack/module shown in FIG. 13, each mounting platform 1303 extends at a non-perpendicular angle from the left side of each bus bar 1301 and is arcuately shaped with a gradually decreasing width. The shape of each mounting platform 1303 allows easy placement and attachment of interconnects 1305 between the mounting platform 1303 and four adjacent battery casing terminals 901. To achieve the same ease of interconnect attachment with the interconnects coupled to the central battery terminals (i.e., positive terminal nubs 903), each mounting platform 1307, which extends at a non-perpendicular angle from the right side of each bus bar 1301, includes a pair of platform extensions 1309 and 1310. As shown, each platform extension 1309 and 1310 is an extension of a single platform portion 1311. The use of a pair of platform extensions allows the mounting platform, and thus the bus bar, to connect to the furthest battery nubs (e.g., 903A and 903B) without requiring extended length interconnects. Preferably mounting platform extensions 1309 and 1310 terminate in close proximity to the respective terminals to which they are to be attached.

In the preferred embodiment and as previously noted, each interconnect mounting platform is configured to be attached via interconnects to four batteries, with the four batteries contained in two different rows of batteries. As a result of this configuration, each mounting platform extends past the midpoint between adjacent bus bars, thereby causing the mounting platforms from adjacent bus bars to be interspersed. For example in FIG. 13, plane 1313 is equidistant from bus bars 1301A and 1301B. As shown, each mounting platform 1303 that extends away from bus bar 1301A and towards bus bar 1301B extends past plane 1313 and, similarly, each mounting platform 1307 that extends away from bus bar 1301B and towards bus bar 1301A extends past plane 1313.

Figure 13:
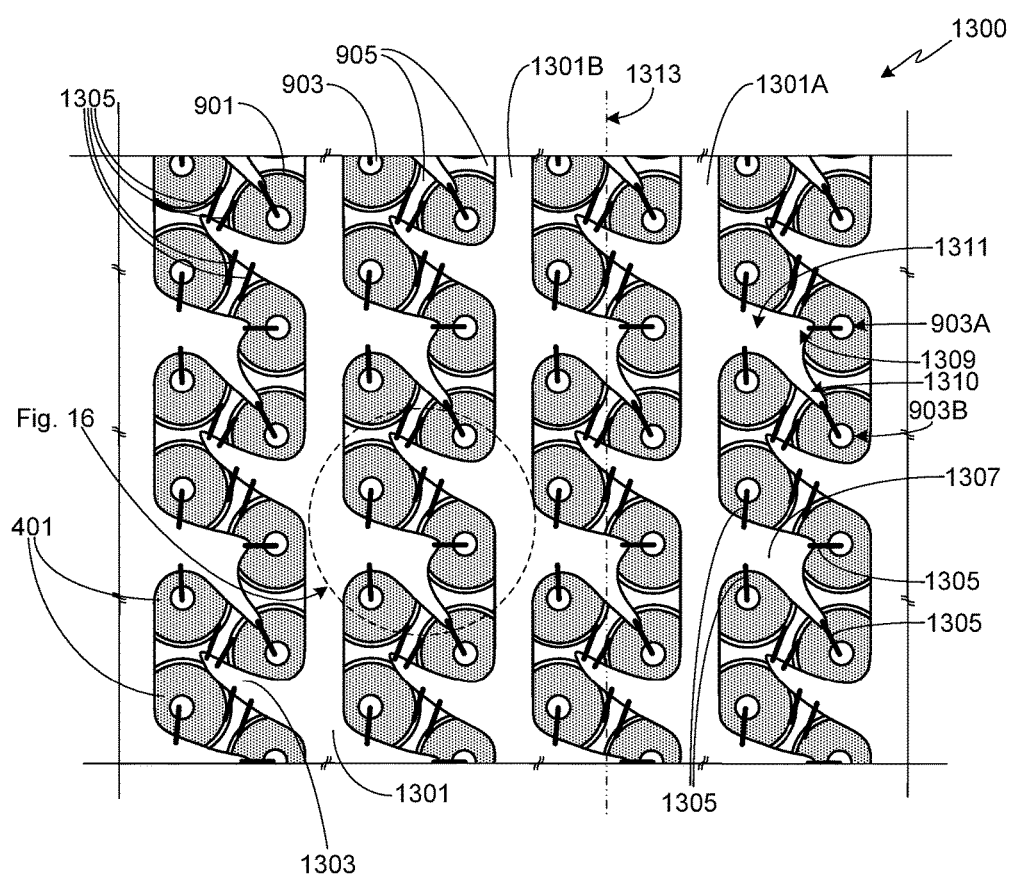
FIG. 13 provides a top view of a battery module utilizing a series of non-overlapping bus bars with interconnect mounting platforms configured in accordance with an alternate preferred embodiment of the invention.
Figure 14:
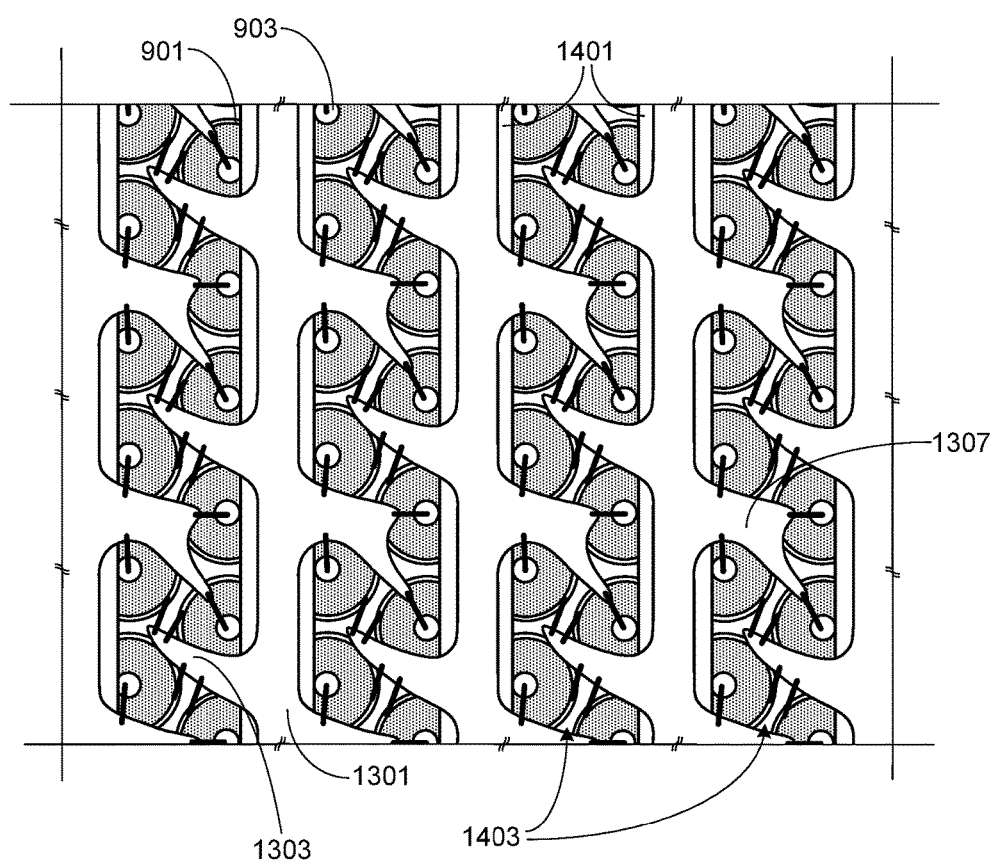
FIG. 14 provides a top view of the battery module shown in FIG. 13 with the inclusion of an electrically non-conductive separator interposed between the bus bar assembly and the batteries.

For purposes of clarity, FIG. 13 does not show an electrical insulator positioned between bus bars 1301 and batteries 401. It will be appreciated, however, that the bus bars cannot be allowed to inadvertently make electrical contact with batteries 401, and more specifically battery terminals 901 and 903. Accordingly, an electrically insulating layer is interposed between the bottom surface of bus bars 1301 and the batteries. In one configuration, and as illustrated in FIG. 14, bus bars 1301 are electrically isolated from batteries 401 with an upper tray member 1401, where upper tray member 1401 is similar to previously described tray members 403 and 1001. In order to provide the desired electrical isolation, member 1401 is fabricated from an electrically insulative material such as a plastic (e.g., polycarbonate, acrylonitrile butadiene styrene (ABS), polypropylene (PP), polyethylene (PE), polyethylene terephthalate (PET), nylon, etc.), or the member or at least the bottom surface of the tray member is coated with an electrically insulative material. Tray member 1401 includes a plurality of access apertures 1403 that provide access to the underlying battery terminals, thus allowing bus bar interconnect mounting platforms 1303 and 1307 to be electrically connected to the battery terminals via a plurality of interconnects. Access apertures 1403 may be formed as continuous slots, as illustrated in FIG. 14, thereby providing easy electrical access to the underlying batteries. It should be understood, however, that access apertures 1403 may utilize an alternate shape (e.g., circular, elliptical, etc.) and may be configured to allow access to more or less batteries than the access apertures shown in FIG. 14. Bus bars 1301 may be integrated into tray member 1401, for example by molding the bus bars into the tray member during tray member fabrication; alternately, bus bars 1301 may be bonded into regions molded into the tray member 1401; alternately, bus bars 1301 may be bonded or otherwise attached to the top surface of tray member 1401. Integrating or otherwise attaching bus bars 1301 to member 1401 insures that the bus bars are properly positioned during the battery interconnection process, and that the bus bars do not move after battery pack fabrication as such movement would stress, and potentially damage, the battery interconnects.

Figure 15:
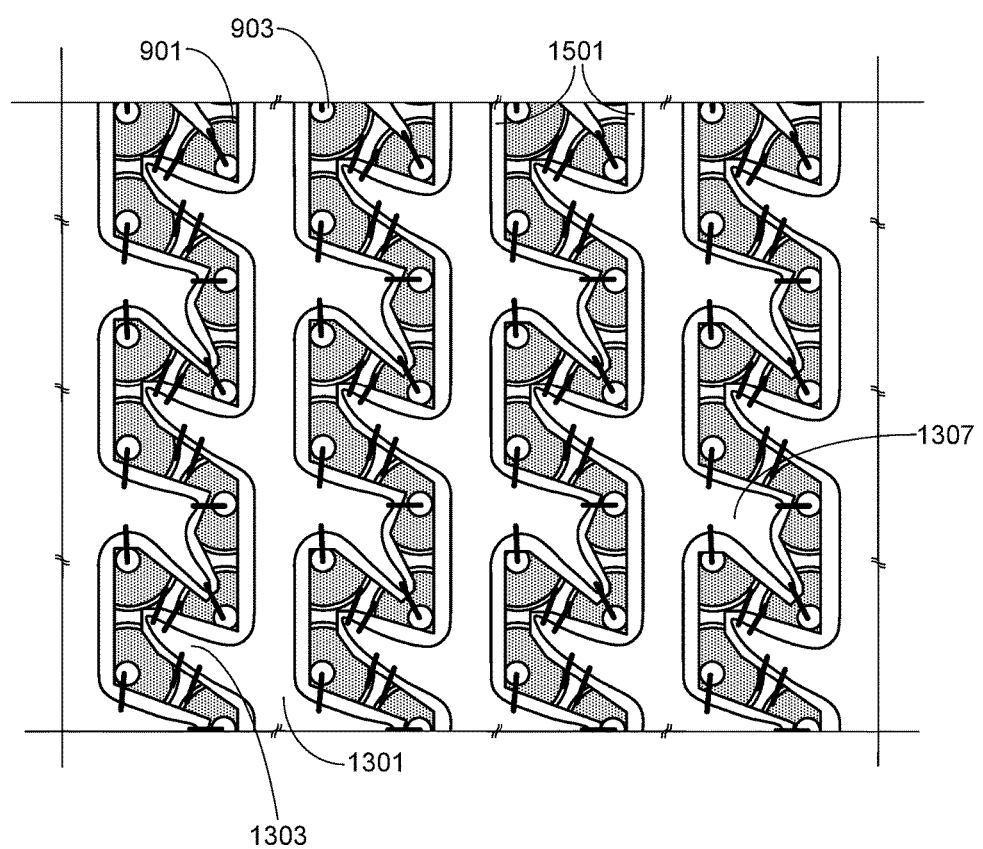
FIG. 15 provides a top view of the battery module shown in FIG. 13 with the inclusion of an electrically non-conductive separator layer attached to the lowermost surface of the bus bar assembly.
Figure 16:
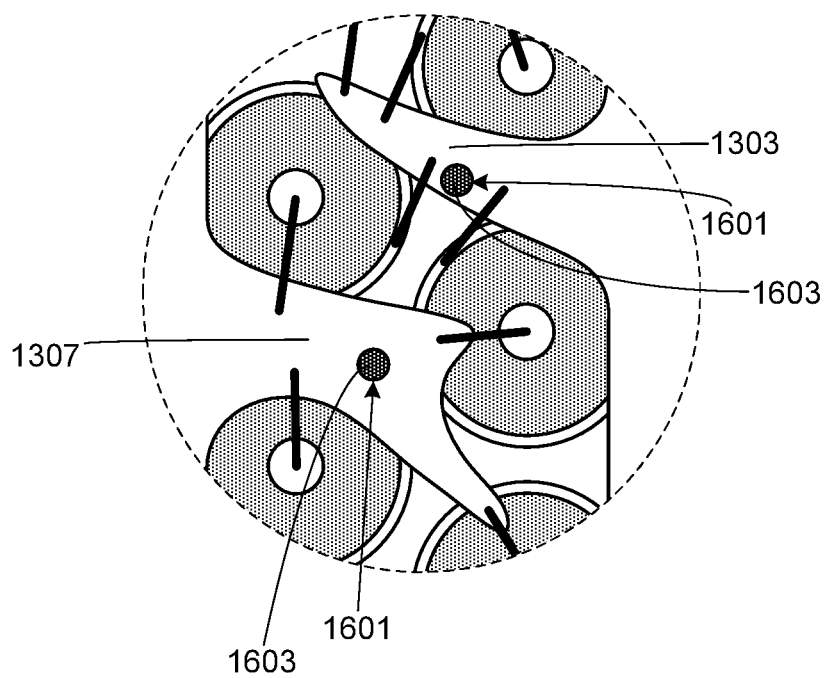
FIG. 16 provides additional detail regarding the location of an interconnect mounting platform relative to the underlying batteries.

FIG. 15 illustrates an alternate configuration for electrically isolating bus bars 1301 from the underlying batteries. As shown, an electrical insulator 1501 is applied to the bottom surface of the bus bars as well as the associated interconnect mounting platforms. As with the approach described relative to FIG. 14, the approach used in this configuration not only prevents inadvertent shorting between the bus bars and the batteries, but also helps to stabilize the bus bars, thereby insuring proper bus bar placement and minimal strain on the interconnects due to bus bar movement after pack fabrication. Preferably this approach uses a layer stacking fabrication technique, for example by stacking the bus bars onto an electrically insulating layer of resin impregnated fiberglass or other suitable electrically insulating material.

The interconnects 1305 that are used to couple interconnect mounting platforms 1303 to battery terminals 901 and to couple interconnect mounting platforms 1307 to battery terminals 903 preferably use wire bond interconnects as described above relative to the embodiment shown in FIG. 9. Alternately, or as a replacement for some of the wire bond interconnects, the system may use ribbon interconnects. As noted above, the large surface area offered by ribbon interconnects makes them especially useful in connecting to the crimped edge region 901 of each battery 401 due to the relatively small size of this region as well as variations in this region's size due to manufacturing tolerances. The interconnects, i.e., wire bond and/or ribbon interconnects, may be attached using any conventional bonding technique suitable for the selected wire gauge, wire material and bus bar material. Exemplary coupling techniques include laser welding (e.g., laser oscillation welding, laser micro welding), e-beam welding, resistance bonding, ultrasonic bonding, thermosonic bonding, and thermocompression bonding.

In order to minimize the potential for interconnect damage, preferably each interconnect mounting platform is rigidly fixed to an underlying structure as in the prior embodiment. While the interconnect mounting platforms may be fixed to an electrical insulator positioned between bus bars 1301 and batteries 401, e.g., tray member 1401 or insulator 1501, preferably the interconnect mounting platforms are rigidly fixed to separator structure 905. Fixing each mounting platform to separator 905 is preferred regardless of whether the separator is comprised of a filler or comprised of a pre-fabricated structure, both of which are described above. The mounting platforms may be bonded, staked, clamped, pinned, or otherwise fixed to separator 905 (or to an electrical insulator such as members 1401 and 1501). In at least one configuration of the preferred embodiment illustrated in FIGS. 13-15, and as shown in the detailed view of FIG. 16, each mounting platform 1303 and 1307 includes an aperture 1601. A heat stake 1603, passing through aperture 1601, is then used to fix the platform to separator 905. Rigidly fixing the mounting platforms to the separator, or insulator, helps to minimize platform movement, thereby minimizing the potential for interconnect damage after battery pack fabrication is complete and the pack is in use, for example as the battery pack of an EV.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery assembly, comprising:
a plurality of batteries divided into rows, each battery of said plurality of batteries comprising a first terminal at a first end portion of said battery and a second terminal at said first end portion of said battery, wherein said plurality of batteries are divided into a plurality of battery groups, wherein each battery group of said plurality of battery groups is comprised of at least two of said rows, wherein said batteries within each battery group are electrically connected in parallel, and wherein said battery groups of said plurality of battery groups are electrically connected in series; and
a plurality of non-overlapping bus bars configured in an alternating pattern with said plurality of battery groups, wherein said alternating pattern alternates a single bus bar of said plurality of non-overlapping bus bars with a single battery group of said plurality of battery groups, each single bus bar of said plurality of non-overlapping bus bars comprising:
a first plurality of interconnect mounting platforms extending at a first non-perpendicular angle from a first edge of said single bus bar, wherein each of said first plurality of interconnect mounting platforms is arcuately shaped, wherein each of said first plurality of interconnect mounting platforms is electrically connected to a first subset of said plurality of batteries via said first terminals of said first subset of said plurality of batteries, and wherein said first subset of said plurality of batteries is comprised of at least four batteries of said plurality of batteries; and
a second plurality of interconnect mounting platforms extending at a second non-perpendicular angle from a second edge of said single bus bar, wherein each of said second plurality of interconnect mounting platforms is comprised of an initial platform portion extending from said second edge of said single bus bar and a pair of platform extensions extending from said initial platform portion, wherein said initial platform portion of each of said second plurality of interconnect mounting platforms is electrically connected to a second subset of said plurality of batteries via said second terminals of said second subset of said plurality of batteries, wherein said second subset of said plurality of batteries is comprised of at least one battery of said plurality of batteries, wherein a first platform extension of said pair of platform extensions is electrically connected to a third subset of said plurality of batteries via said second terminals of said third subset of said plurality of batteries, wherein said third subset of said plurality of batteries is comprised of at least one battery of said plurality of batteries, wherein a second platform extension of said pair of platform extensions is electrically connected to a fourth subset of said plurality of batteries via said second terminals of said fourth subset of said plurality of batteries, and wherein said fourth subset of said plurality of batteries is comp iced of at least one battery of said plurality of batteries.

2. The battery assembly of claim 1, wherein said first plurality of interconnect mounting platforms is fixed to an underlying structure.

3. The battery assembly of claim 1, wherein said second plurality of interconnect mounting platforms is fixed to an underlying structure.

4. The battery assembly of claim 1, wherein said first plurality of interconnect mounting platforms is fixed to an underlying structure, and wherein said second plurality of interconnect mounting platforms is fixed to said underlying structure.

5. The battery assembly of claim 4, said underlying structure comprising an electrical insulator positioned between said plurality of batteries and said plurality of non-overlapping bus bars.

6. The battery assembly of claim 4, said underlying structure comprising a battery separator structure.

7. The battery assembly of claim 4, further comprising a first plurality of mounting apertures corresponding to said first plurality of interconnect mounting platforms and a second plurality of mounting apertures corresponding to said second plurality of interconnect mounting platforms, wherein said first and second pluralities of interconnect mounting platforms are fixed to said underlying structure via said first and second pluralities of mounting apertures.

8. The battery assembly of claim 4, wherein said first and second pluralities of interconnect mounting platforms are fixed to said underlying structure using a technique selected from bonding, staking, clamping and pinning.

9. The battery assembly of claim 1, said first battery terminal of each battery of said plurality of batteries comprising a crimped edge region integral to a battery casing corresponding to each battery of said plurality of batteries.

10. The battery assembly of claim 1, said second battery terminal of each battery of said plurality of batteries comprising a terminal nub integrated into a central region of a battery cap assembly.

11. The battery assembly of claim 1, said each single bus bar of said plurality of non-overlapping bus bars further comprising:

a first plurality of wire bond interconnects, wherein each of said first plurality of interconnect mounting platforms is electrically connected to said first subset of said plurality of batteries by said first plurality of wire bond interconnects; and a second plurality of wire bond interconnects, wherein each of said second plurality of interconnect mounting platforms is electrically connected to said second, third and fourth subsets of said plurality of batteries by said second plurality of wire bond interconnects.

12. The battery assembly of claim 1, said each single bus bar of said plurality of non-overlapping bus bars further comprising:

a first plurality of ribbon interconnects, wherein each of said first plurality of interconnect mounting platforms is electrically connected to said first subset of said plurality of batteries by said first plurality of ribbon interconnects; and a second plurality of ribbon interconnects, wherein each of said second plurality of interconnect mounting platforms is electrically connected to said second, third and fourth subsets of said plurality of batteries by said second plurality of ribbon interconnects.

13. The battery assembly of claim 1, said each single bus bar of said plurality of non-overlapping bus bars further comprising:

a first plurality of ribbon interconnects, wherein each of said first plurality of interconnect mounting platforms is electrically connected to said first subset of said plurality of batteries by said first plurality of ribbon interconnects; and a second plurality of wire bond interconnects, wherein each of said second plurality of interconnect mounting platforms is electrically connected to said second, third and fourth subsets of said plurality of batteries by said second plurality of wire bond interconnects.

14. The battery assembly of claim 1, further comprising an electrical insulator positioned between said plurality of batteries and said plurality of non-overlapping bus bar.

15. The battery assembly of claim 14, said electrical insulator comprising a tray member, said plurality of non-overlapping bus bars attached to an upper surface of said tray member, said tray member further comprising a plurality of apertures, wherein said plurality of apertures provide access to said first terminal and to said second terminal of each battery of said plurality of batteries.

16. The battery assembly of claim 14, wherein said electrical insulator is comprised of an electrically insulutive layer attached to a lower surface of at least a portion of said plurality of non-overlapping bus bars.

17. The battery assembly of claim 1, wherein said plurality of non-overlapping bus bars are of approximately uniform thickness.

* * * * *